United States Patent
Ijiri et al.

(10) Patent No.: US 10,170,752 B2
(45) Date of Patent: Jan. 1, 2019

(54) METHOD FOR PRODUCING AMORPHOUS CARBON PARTICLE, AMORPHOUS CARBON PARTICLES, NEGATIVE ELECTRODE MATERIAL FOR LITHIUM ION SECONDARY BATTERIES, AND LITHIUM ION SECONDARY BATTERY

(71) Applicant: JFE CHEMICAL CORPORATION, Tokyo (JP)

(72) Inventors: Makiko Ijiri, Chiba (JP); Ryuta Haga, Chiba (JP); Tetsuo Shiode, Chiba (JP); Katsuhiro Nagayama, Chiba (JP)

(73) Assignee: JFE CHEMICAL CORPORATION, Tokyo (JP)

(*) Notice: Subject to any disclaimer, the term of this patent is extended or adjusted under 35 U.S.C. 154(b) by 444 days.

(21) Appl. No.: 14/407,727

(22) PCT Filed: Jun. 12, 2013

(86) PCT No.: PCT/JP2013/003689
§ 371 (c)(1),
(2) Date: Dec. 12, 2014

(87) PCT Pub. No.: WO2013/187061
PCT Pub. Date: Dec. 19, 2013

(65) Prior Publication Data
US 2015/0171417 A1    Jun. 18, 2015

(30) Foreign Application Priority Data

Jun. 13, 2012  (JP) ................ 2012-133479
Apr. 19, 2013  (JP) ................ 2013-087984

(51) Int. Cl.
| | | |
|---|---|---|
| H01B 1/04 | (2006.01) |
| C01B 32/00 | (2017.01) |
| C01B 32/05 | (2017.01) |
| H01M 4/36 | (2006.01) |
| H01M 4/133 | (2010.01) |
| H01M 4/587 | (2010.01) |
| H01M 10/0525 | (2010.01) |
| H01M 4/02 | (2006.01) |

(52) U.S. Cl.
CPC ............ *H01M 4/364* (2013.01); *C01B 32/00* (2017.08); *C01B 32/05* (2017.08); *H01B 1/04* (2013.01); *H01M 4/133* (2013.01); *H01M 4/587* (2013.01); *H01M 10/0525* (2013.01); *H01M 2004/027* (2013.01)

(58) Field of Classification Search
CPC .......... H01B 1/04; C01B 31/00; C01B 31/02; C01B 32/00; C01B 32/05
See application file for complete search history.

(56) References Cited

U.S. PATENT DOCUMENTS

| | | | | |
|---|---|---|---|---|
| 5,874,166 A * | 2/1999 | Chu | ............ | H01M 4/587 423/447.2 |
| 2008/0044656 A1* | 2/2008 | Ko | ............ | C01B 31/04 428/403 |
| 2008/0286191 A1 | 11/2008 | Stansberry et al. | | |
| 2013/0251621 A1* | 9/2013 | Suzuki | ............ | H01M 4/587 423/460 |

FOREIGN PATENT DOCUMENTS

| | | |
|---|---|---|
| CN | 102280629 A | 12/2011 |
| EP | 0456278 * | 11/1991 |
| EP | 1134827 A2 | 9/2001 |
| EP | 2 372 820 A1 | 10/2011 |
| EP | 2 461 397 A1 | 6/2012 |
| JP | H03-252053 A | 11/1991 |
| JP | H06-89721 A | 3/1994 |
| JP | H08-115723 A | 5/1996 |
| JP | H09-153359 A | 6/1997 |
| JP | 2003-173778 A | 6/2003 |
| JP | 2004-273424 A | 9/2004 |
| JP | 2008-091249 A | 4/2008 |
| JP | 2009-117240 A | 5/2009 |
| JP | 2009-280486 A | 12/2009 |
| JP | 2011-079737 A | 4/2011 |
| JP | 2011-258585 A | 12/2011 |
| JP | WO 2012066928 A1 * | 5/2012 ............ H01M 4/587 |
| TW | 200950193 A | 12/2009 |
| WO | 2009/131161 A1 | 10/2009 |

OTHER PUBLICATIONS

Machine translation of JPH09-153359.*
Feb. 11, 2015 Search Report issued in European Patent Application No. 13805108.1.
Jan. 6, 2016 Office Action issued in Korean Patent Application No. 10-2014-7031798.
Jul. 26, 2016 Office Action issued in Korean Patent Application No. 10-2014-7031798.
Aug. 31, 2015 Office Action issued in Chinese Patent Application No. 201380030811.X.

(Continued)

*Primary Examiner* — Haidung D Nguyen
(74) *Attorney, Agent, or Firm* — Oliff PLC

(57) ABSTRACT

A method for producing an amorphous carbon particle includes the steps of: obtaining a first crosslinked product by admixing mesophase particles with an amorphous carbon precursor and thereafter subjecting the mixture to a crosslinking treatment, or obtaining a second crosslinked product by crosslinking the amorphous carbon precursor and thereafter admixing the mesophase particles with the crosslinked precursor; and subjecting the first or second crosslinked product to an infusibilization treatment and thereafter firing the product to produce amorphous carbon particles including the mesophase particles within the particles.

15 Claims, 1 Drawing Sheet

(56) References Cited

OTHER PUBLICATIONS

Oct. 26, 2016 Office Action issued in Chinese Patent Application No. 201380030811.X.
May 9, 2016 Office Action issued in Chinese Patent Application No. 201380030811.X.
J.S. Kim et al., "Charge-discharge Properties of Surface-Modified Carbon by Resin Coating in Li-Ion Battery". Journal of Power Sources, vol. 104, pp. 175-180, Dec. 31, 2002.

\* cited by examiner

←→
20 μm

METHOD FOR PRODUCING AMORPHOUS CARBON PARTICLE, AMORPHOUS CARBON PARTICLES, NEGATIVE ELECTRODE MATERIAL FOR LITHIUM ION SECONDARY BATTERIES, AND LITHIUM ION SECONDARY BATTERY

TECHNICAL FIELD

The present invention relates to a method for producing amorphous carbon particle, amorphous carbon particles, negative electrode materials for lithium ion secondary batteries, and lithium ion secondary batteries.

BACKGROUND ART

Nickel-metal hydride batteries have been used heretofore as rechargeable batteries for hybrid automobiles mainly from the viewpoints of costs and weight saving. Lithium ion secondary batteries have high voltage per battery and also have high energy density, and the application of such batteries is expected to realize further reduction of weight.

Batteries for automobiles running on electricity alone such as electric vehicles are to be made of materials having high energy density in order to ensure a long driving distance per charging. The use of graphite materials for negative electrodes has been widely studied.

On the other hand, hybrid automobile batteries are a system which has a small capacity of batteries mounted on automobiles and therefore needs to regenerate energy by regenerative braking. In this system, batteries having high input and output densities during charging and discharging are demanded, and the use of amorphous carbon particles represented by hard carbons has been studied.

CITATION LIST

Patent Literature

PTL 1: Japanese Unexamined Patent Application Publication No. 3-252053
PTL 2: Japanese Unexamined Patent Application Publication No. 6-89721
PTL 3: Japanese Unexamined Patent Application Publication No. 8-115723
PTL 4: Japanese Unexamined Patent Application Publication No. 9-153359

SUMMARY OF INVENTION

Technical Problem

Amorphous carbon particles are largely classified into soft carbons that, at a precursor stage, are composed of graphitizable mesophase structures in which graphene sheets are stacked on top of one another, and hard carbons that, at a precursor stage, are optically isotropic and are free from mesophase structures.

In general, hard carbons have lower true specific gravity than soft carbons when baked at the same temperature (the true specific gravity of general hard carbons as measured by a true specific gravity measurement method using butanol is as low as 1.5 to 1.6, although variable depending on the firing temperature and raw materials). The particles of hard carbons are hard. Therefore, it is difficult to increase the electrode density. Consequently, the electrodes incur poor pressability at times.

Despite this, hard carbons, when used as negative electrode materials in lithium ion secondary batteries, exhibit small expansion and shrinkage during charging and discharging due to the crosslinked structure in the particles.

On the other hand, soft carbons have larger expansion and shrinkage than the hard carbons during charging and discharging, although their expansion and shrinkage is small as compared to graphites. Large expansion and shrinkage that take place during charging and discharging may give rise to the occurrence of problems during long battery cycles.

The present invention has been made in light of the aforementioned problems. It is therefore an object of the invention, for example, to obtain amorphous carbon particles exhibiting excellent pressability and having small expansion and shrinkage during charging and discharging.

Solution to Problem

The present inventors carried out extensive studies to achieve the above object. As a result, the present inventors have found that high electrode density and good pressability may be obtained and the expansion and shrinkage during charging and discharging may be suppressed by allowing amorphous carbon particles to include mesophase particles within the particles.

Specifically, embodiments of the present invention provide the following (1) to (6).

(1) A method for producing an amorphous carbon particle including the steps of: obtaining a first crosslinked product by admixing mesophase particles with an amorphous carbon precursor and thereafter subjecting the mixture to a crosslinking treatment, or obtaining a second crosslinked product by crosslinking the amorphous carbon precursor and thereafter admixing the mesophase particles with the crosslinked precursor; and subjecting the first or second crosslinked product to a infusibilization treatment and thereafter firing the product to produce amorphous carbon particles including the mesophase particles within the particles.

(2) The method for producing an amorphous carbon particle described in (1), wherein the mesophase particles are added in an amount of 1 to 70 mass % relative to the amorphous carbon precursor.

(3) Amorphous carbon particles including a mesophase structure within the particles.

(4) The amorphous carbon particles described in (3), wherein the content of the mesophase structure is 1 to 80 mass %.

(5) A negative electrode material for lithium ion secondary batteries, including the amorphous carbon particles described in (3) or (4).

(6) A lithium ion secondary battery including the amorphous carbon particles described in (3) or (4) as a negative electrode material.

Advantageous Effects of Embodiments of the Invention

According to examples of the present invention, amorphous carbon particles may be obtained which exhibit excellent pressability and have small expansion and shrinkage during charging and discharging.

DESCRIPTION OF EMBODIMENTS

Amorphous Carbon Particle Production Methods

Figure 1:
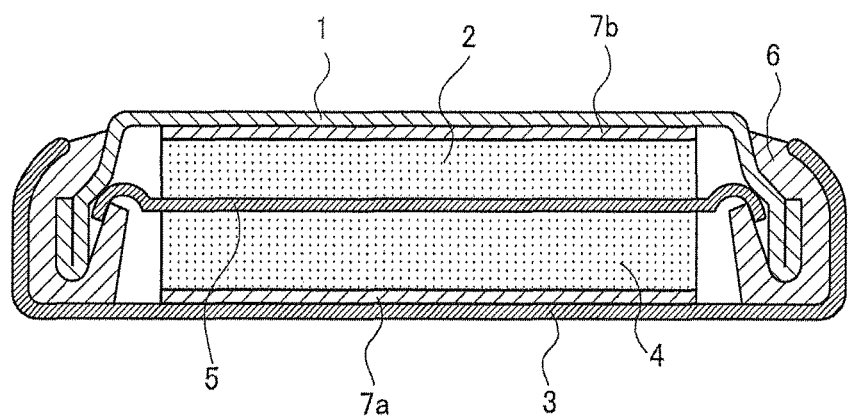
FIG. 1 is a sectional view illustrating a sample coin-shaped secondary battery.

An amorphous carbon particle production method according to embodiments of the present invention (hereinafter, also written simply as the "inventive production method") generally includes the steps of: obtaining a first crosslinked product by admixing mesophase particles with an amorphous carbon precursor and thereafter subjecting the mixture to a crosslinking treatment, or obtaining a second crosslinked product by crosslinking the amorphous carbon precursor and thereafter admixing the mesophase particles with the crosslinked precursor; and subjecting the first or second crosslinked product to an infusibilization treatment and thereafter firing the product to produce amorphous carbon particles including the mesophase particles within the particles.

Hereinbelow, the inventive production method will be described in detail.

[Amorphous Carbon Precursors]

The precursors for amorphous carbon used in embodiments of the invention are not particularly limited, and known such materials may be used. Examples include pitches such as coal pitches and petroleum pitches; resins such as phenolic resins and furan resins; and mixtures of pitches and resins. In particular, pitches such as coal pitches and petroleum pitches are preferable from viewpoints such as economic efficiency.

Specific examples of the coal pitches include coal tar pitch and coal liquefaction pitch. Specific examples of the petroleum pitches include decant oil pitch and ethylene tar pitch.

When the pitches are used, the quinoline insoluble (QI) content is not particularly limited but is preferably not more than 2 mass % from the viewpoint of increasing the capacity of batteries.

[Mesophase Particles]

The mesophase particles used in embodiments of the invention are optically anisotropic carbonaceous particles that are composed of mesophase structures in which polycyclic aromatic planar molecules (giant molecules of polycyclic aromatic hydrocarbons having a planar dimension) are stacked on top of one another in parallel. Examples thereof include mesocarbon microspheres, bulk mesophase pitches and mesophase pitch carbon fibers. Heat-treated products of these particles are also usable. In this case, the heat treatment temperature is preferably 1500° C. or less.

Whether or not the mesophase particles are optically anisotropic may be determined by observing a cross section of a sample with a polarizing microscope.

The mesophase particles such as bulk mesophase pitches may be such that optically isotropic pitch portions remain in the particles or have been added to the particles. When such an optically isotropic pitch portion is added to the pitch, the proportion thereof is preferably not more than 30 mass %. For a residual optically isotropic pitch portion, the QI (quinoline insoluble) content is preferably 70 mass % or more. With a large proportion of such optically isotropic portions, the true specific gravity of the obtainable amorphous carbon particles is decreased, and consequently the advantageous effects of the invention may not be fully obtained at times.

Further, bulk mesophase pitches may be such that the isotropic portions have been infusibilized beforehand. By being rendered infusible, the optically isotropic portions are strongly bonded to the mesophase portions through intermediate layers without being separated from each other by subsequent treatment, and this structure is maintained even after firing. As a result, additional effects are obtained by the formation of layers having a gradient of concentrations of the mesophase portions and the optically isotropic portions within the particles. In this process, the infusibilization degree of the bulk mesophase (the oxygen content after the infusibilization treatment) is preferably not more than 10 mass %, and more preferably not more than 8 mass %. If the infusibilization degree is above this level, the true specific gravity may be lowered or the structure of the gradient layers may become brittle at times.

When a petroleum-derived or coal-derived heavy oil, or a petroleum-derived or coal-derived pitch is heated at 350 to 500° C., optically anisotropic spheres ("mesocarbon microspheres") are formed in the mother liquor at an initial stage of heating. Further heating causes the mesocarbon microspheres to combine together and grow successively, resulting in an optically anisotropic substance ("bulk mesophase pitch") representing the entirety of the mother liquor.

Carbon fibers produced from bulk mesophase pitches are "mesophase pitch carbon fibers".

The average particle diameter of the mesophase particles is variable depending on the particle diameters of the final amorphous carbon particles, but is preferably 1 to 25 μm, and more preferably 3 to 15 μm. If the particle diameters of the mesophase particles are excessively small, mixing of such particles becomes difficult and consequently the mesophase particles may not be allowed to be included within the amorphous carbon particles at times. If, on the other hand, the particle diameters are excessively large, the mesophase particles and the amorphous carbon precursor that is the matrix are coarsened, and the probability is increased for the surface of the mesophase particles to be exposed during grain size adjustment. In contrast, the above range of particle diameters ensures that the mesophase particles will be easily included within the matrix, namely, the occurrence of a large number of single particles will be prevented, and also reduces the probability that the surface of the mesophase particles will be exposed.

In embodiments of the invention, the average particle diameter of the mesophase particles is measured with a laser diffraction grain size distribution analyzer.

[Admixing]

In an embodiment of the inventive production method, first, the mesophase particles are admixed with the amorphous carbon precursor (hereinafter, also written simply as the "precursor"). The admixing method is not particularly limited. For example, the precursor may be heated to a fluid state with use of an autoclave equipped with a stirrer, thereafter the mesophase particles may be added in small portions while performing stirring, and the mixture may be stirred to homogeneity.

In this process, the amount in which the mesophase particles are added is preferably 1 to 70 mass %, and more preferably 5 to 50 mass % relative to the precursor, although variable depending on the shape of the mesophase particles. If the mesophase particles are added in an excessively large amount, the probability is decreased for the amorphous carbon particles to include all of the mesophase particles within the amorphous carbon particles. If the amount is too small, it may be difficult at times to obtain high true specific gravity. In contrast, the above range of the amount of the mesophase particles added ensures that the amorphous carbon particles will include almost all of the mesophase particles and consequently the expansion and shrinkage during charging will be suppressed more effectively, and also ensures that the true specific gravity will be further increased.

[Crosslinking Treatment]

Next, the mixture is subjected to a crosslinking treatment to produce a crosslinked product (a first crosslinked product). Examples of the methods of the crosslinking treatment include methods involving air blowing reaction; dry methods involving an oxidizing gas (air, oxygen); and wet methods involving an aqueous solution of, for example, nitric acid, sulfuric acid, hypochlorous acid or a mixed acid. In particular, methods involving air blowing reaction are preferred.

For example, the air blowing reaction is such a reaction in which the softening point is increased by blowing an oxidizing gas (such as air, oxygen, ozone or a mixture of any of these gases) while performing heating. By the air blowing reaction, the obtainable crosslinked product (for example, air blown pitch) may attain a high melting point of, for example, 200° C. or more.

According to Patent Literature 4, the air blowing reaction is a liquid phase reaction and is known for the fact that oxygen atoms are not substantially incorporated into the carbon materials compared to the crosslinking treatment in a solid phase.

The main reaction in the air blowing reaction is oxidative dehydration reaction, and polymerization proceeds by the formation of biphenyl crosslinking bonds. It is considered that the subsequent infusibilization treatment and firing (described later) of the crosslinked product result in carbon particles which possess an amorphous three-dimensional structure dominated by these crosslinked portions and have a large number of voids for storing lithium.

The conditions in the air blowing reaction are not particularly limited. However, any excessively high temperature causes mesophases to be developed, and an excessively low temperature decreases the reaction rate. For these reasons, the reaction temperature is preferably 280 to 420° C., and more preferably 320 to 380° C. The blowing rate for the oxidizing gas, in this case air, is preferably 0.5 to 10 L/min, and more preferably 1.0 to 2 L/min per 1000 g of the pitch. The reaction pressure is not particularly limited and may be any of normal pressure, reduced pressure and increased pressure.

In another embodiment of the inventive production method, the amorphous carbon precursor may be crosslinked first and thereafter the mesophase particles may be admixed with the crosslinked precursor to produce a crosslinked product (a second crosslinked product). The crosslinking treatment method and the admixing method may be the same as described in the above embodiment.

The first crosslinked product and the second crosslinked product will be also collectively referred to as the "crosslinked product" hereinafter for simplicity.

To facilitate the infusibilization treatment, the softening point of the crosslinked product obtained as described above is preferably 200 to 400° C., and more preferably 250 to 350° C. If this temperature is low, fusion tends to occur during the infusibilization treatment, resulting in a failure of the infusibilization reaction. If this temperature is high, difficulties are encountered in the subsequent crushing.

[Crushing]

The crosslinked product is preferably crushed to control the grain size. The crushing method is not particularly limited, and any known methods may be used. For example, the average particle diameter after the crushing is preferably 1 to 50 µm, and more preferably 2 to 15 µm. If the particles are crushed to a smaller average particle diameter, the mesophase particles present inside the particles may be disadvantageously exposed. If the average particle diameter is excessively large, the inclusion of the mesophase particles becomes difficult. The crushing may be performed after the infusibilization treatment described later.

In embodiments of the invention, the average particle diameter after the crushing is measured with a laser diffraction grain size distribution analyzer.

[Infusibilization Treatment]

Next, the crosslinked product which has been crushed appropriately is subjected to an infusibilization treatment to give an infusibilized product. The infusibilization treatment is a type of crosslinking treatment (oxidation treatment) performed in a solid phase in which oxygen is incorporated into the crosslinked product and the product is further crosslinked to become resistant to being melted at high temperatures.

The method for performing the infusibilization treatment is not particularly limited, and examples thereof include dry methods involving an oxidizing gas (air, oxygen); and wet methods involving an aqueous solution of, for example, nitric acid, sulfuric acid, hypochlorous acid or a mixed acid. In particular, dry methods involving an oxidizing gas are preferred.

In the infusibilization treatment, the treatment temperature is preferably selected such that the temperature is not more than the softening point of the crosslinked product. In the case of a batch method, the heating rate is preferably 5 to 100° C./h, and more preferably 10 to 50° C./h to prevent the occurrence of fusion more reliably. An excessively high heating rate increases the probability that the crosslinked product will be fused, and consequently does not allow the infusibilization treatment to proceed. If, on the other hand, the heating rate is excessively low, the infusibilization treatment requires a long time to cause economic disadvantages.

Other treatment conditions in the infusibilization treatment are not particularly limited. For example, the blowing rate for the oxidizing gas, in this case air, is preferably 1.0 to 20 L/min, and more preferably 2.0 to 10 L/min per 1000 g of the raw material. The reaction pressure is not particularly limited and may be any of normal pressure, reduced pressure and increased pressure. If the amount of air is excessively small, the infusibilization treatment does not proceed smoothly and requires a long time to cause economic disadvantages. Supplying an excessively large amount of air is not economical because the excess air consumes extra heat.

The oxygen content in the infusibilized product obtained by the infusibilization treatment is preferably 3 to 20 mass %, and more preferably 5 to 15 mass %. The result of the infusibilization treatment is insufficient if the oxygen content is excessively low, and the product will be melted in the subsequent firing step. If the oxygen content is excessively increased, the yield of the product is lowered to cause economic disadvantages, and also the initial efficiency is decreased.

[Firing]

After the infusibilization treatment, the infusibilized product is baked under reduced pressure or in an atmosphere of an inert gas such as nitrogen to give carbon particles. In this process, the heating rate is preferably 50 to 150° C./h, and more preferably 80 to 120° C./h. The temperature to be reached (the firing temperature) is preferably 1000 to 1300° C., and more preferably 1000 to 1200° C. Excessively low firing temperatures cause a decrease in initial efficiency and also a decrease in battery capacity. If the firing temperature is excessively high, the discharging capacity is lowered and the battery capacity is decreased.

In embodiments of the invention, the crosslinked product or the infusibilized product may be subjected to a mechanochemical treatment. By such a treatment, the particles are rubbed against one another with the result that the particles obtained after the firing will have rounded corners. Consequently, it is expected that the electrode density will be increased and the pressability will be further enhanced.

Exemplary apparatuses for use in the mechanochemical treatment include kneaders such as pressure kneaders and two-roll mills, planetary ball mills, Hybridization System (manufactured by NARA MACHINERY CO., LTD.), Mechanomicros (manufactured by NARA MACHINERY CO., LTD.) and Mechanofusion System (manufactured by Hosokawa Micron Group).

[Amorphous Carbon Particles]

Amorphous carbon particles according to embodiments of the present invention may be obtained by a method such as, for example, the inventive production method described hereinabove. The amorphous carbon particles include a mesophase structure, specifically, mesophase particles within the particles. It is not necessary that the mesophase particles be completely buried as long as the mesophase particles are partially joined (fused together) with amorphous carbon. The advantageous effects of the invention become more marked as this joint area is increased.

The embodiments of the invention also include amorphous carbon particles that are obtained by heat treating a precursor for amorphous carbon to generate a mesophase structure beforehand and thereafter subjecting the heat-treated precursor to treatments such as the aforementioned crosslinking treatment.

In the amorphous carbon particles of embodiments of the invention, the true specific gravity of the particles as a whole may be increased by allowing the amorphous carbon particles to include mesophase particles (a mesophase structure) having a higher true specific gravity than the amorphous carbon. With this configuration, the electrode density may be increased and the pressability may be enhanced. Although electrodes obtained by direct firing of mesophase particles exhibit large expansion and shrinkage during charging and discharging, such expansion may be suppressed when the mesophase particles are included within amorphous carbon particles.

Thus, the inventive amorphous carbon particles may be suitably used in batteries that are charged and discharged repeatedly over a long period, such as vehicle batteries.

The amorphous carbon particles of embodiments of the invention cannot be obtained when the uncrosslinked raw material is crosslinked without being mixed with the mesophase particles and is thereafter subjected to the infusibilization treatment, and the mesophase particles are admixed with the infusibilized product resulting from the infusibilization treatment and the mixture is baked.

In the amorphous carbon particles of embodiments of the invention, the content of the mesophase particles (the mesophase structure) is preferably 1 to 80 mass %, and more preferably 5 to 50 mass % for the reasons that higher true specific gravity may be obtained and also expansion and shrinkage may be suppressed more effectively. If the content of the mesophase particles (the mesophase structure) is excessively small, only a small increase in true specific gravity is obtained. If the content is excessively large, it becomes difficult for the mesophase particles to be included within the particles, resulting in imperfect suppression of expansion and shrinkage.

The average particle diameter of the amorphous carbon particles may be variable depending on the characteristics of batteries that are actually used. To improve input and output characteristics, the average particle diameter is preferably 1 to 25 μm, and more preferably 2 to 15 μm. The average particle diameter may be adjusted to such an extent that the mesophase particles included within the particles are not markedly exposed.

The average particle diameter of the inventive amorphous carbon particles is measured with a laser diffraction grain size distribution analyzer.

To suppress the reactivity with respect to electrolyte, the specific surface area of the amorphous carbon particles of embodiments of the invention is preferably not more than 10 $m^2/g$. In embodiments of the invention, the specific surface area is measured by a BET method utilizing the adsorption of nitrogen gas.

In the amorphous carbon particles of embodiments of the invention, the average lattice distance $d_{002}$ of the (002) plane according to X-ray diffractometry (hereinafter, also written simply as the "average lattice distance $d_{002}$") is preferably not less than 0.345 nm for the reason that excellent discharging capacity and cycle life are obtained.

In embodiments of the invention, the average lattice distance $d_{o02}$ is calculated based on the location of the diffraction peak of the (002) plane in the amorphous carbon particles measured with CuK-α radiation as the X-ray and high-purity silicon as the standard substance. The calculation is made in accordance with GAKUSHIN method (the measurement method defined by the 17th committee in JAPAN SOCIETY FOR THE PROMOTION OF SCIENCE). Specifically, the method is described in "Tanso Sen-i (Carbon Fibers) [Sugio OTANI, pp. 733-742 (March, 1986), Kindai Henshu Sha (bookmaking company)]".

The true specific gravity of the amorphous carbon particles of embodiments of the invention is preferably not less than 1.600 $g/cm^3$ since the higher the true specific gravity, the more the electrode density is increased.

In embodiments of the invention, the true specific gravity is measured by a liquid phase substitution method in a pycnometer using butanol in accordance with JIS R7222.

Next, there will be described lithium ion secondary batteries including the embodiments of the inventive amorphous carbon particles as a negative electrode material (hereinafter, also written as the "lithium ion secondary batteries of embodiments of the invention").

[Lithium Ion Secondary Batteries]

Lithium ion secondary batteries usually include a negative electrode, a positive electrode and a nonaqueous electrolyte as the main battery components. The positive and negative electrodes are each formed of a layered or clustered substance capable of storing lithium ions. During the charging and discharging processes, lithium ions move between the layers. The battery mechanism is such that the lithium ions are doped into the negative electrode during charging, and are dedoped from the negative electrode during discharging.

The lithium ion secondary batteries of embodiments of the invention are not particularly limited except that the inventive amorphous carbon particles are used as a negative electrode material. The other battery components are similar to those in general lithium ion secondary batteries.

[Negative Electrodes]

The negative electrodes may be produced from the inventive amorphous carbon particles by any of usual methods without limitation. In the production of negative electrodes, the inventive amorphous carbon particles may be mixed with a binder to form a negative electrode mixture. The binder is preferably one having chemical stability and electrochemical stability with respect to electrolytes, and is preferably used in an amount of approximately 1 to 20 mass % relative to the total mass of the negative electrode mixture. The mixture may contain carbon particles other than the inventive amorphous carbon particles, or graphite particles.

Specifically, for example, the inventive amorphous carbon particles are mixed with the binder to give a negative electrode mixture paint in the form of a paste, and the negative electrode mixture is usually applied to one or both sides of a collector to form a negative electrode mixture layer. In this process, a usual solvent may be used in the preparation of the paint. The shapes of the collectors used for the negative electrodes are not particularly limited and may be, for example, foils; and nets such as meshes and expanded metals. Examples of the collectors include copper, stainless steel and nickel.

[Positive Electrodes]

The positive electrode material (the positive electrode active material) is preferably selected such that the material can accept/release a sufficient amount of lithium ions for the capacity of the negative electrode material. Examples of such positive electrode active materials include transition metal oxides, transition metal chalcogenides, vanadium oxides, lithium-containing compounds derived from these compounds, Chevrel-phase compounds represented by general formula $M_xMo_6S_{8-y}$ (wherein X is a value in the range of $0 \leq X \leq 4$, Y is a value in the range of $0 \leq Y \leq 1$, and M is a metal such as a transition metal), activated carbons and activated carbon fibers. These materials may be used singly, or two or more may be used in combination. For example, a carbonate salt such as lithium carbonate may be added to the positive electrode.

The lithium-containing transition metal oxides are complex oxides of lithium and a transition metal, or may be solid solutions of lithium and two or more transition metals. Specifically, the lithium-containing transition metal oxides are represented by $LiM(1)_{1-p}M(2)_pO_2$ (wherein P is a value in the range of $0 \leq P \leq 1$, and M(1) and M(2) are each at least one transition metal element, or are represented by $LiM(1)_{2-q}M(2)_qO_4$ (wherein Q is a value in the range of $0 \leq Q \leq 1$, and M(1) and M(2) are each at least one transition metal element). Here, examples of the transition metal elements represented by M include Co, Ni, Mn, Cr, Ti, V, Fe, Zn, Al, In and Sn, with Co, Fe, Mn, Ti, Cr, V and Al being preferred.

For example, such a lithium-containing transition metal oxide may be obtained by mixing oxides or salts of lithium and a transition metal(s) as starting materials in accordance with the target chemical composition and firing the mixture in an oxygen atmosphere at a temperature in the range of 600 to 1000° C. The starting materials are not limited to oxides or salts, and the synthesis is possible from other materials such as hydroxides.

For example, the positive electrodes may be formed from the positive electrode material by mixing the positive electrode material, a binder and a conductive agent to form a positive electrode mixture paint in the form of a paste, and applying the positive electrode mixture paint to one or both sides of a collector to form a positive electrode mixture layer. The binder may be any of those mentioned as examples with respect to the negative electrodes. Examples of the conductive agents include fine particulate carbon materials, fibrous carbon materials, graphites and carbon blacks. The shapes of the collectors are not particularly limited and may be similar to the shapes in the negative electrodes. For example, the collector materials are usually aluminum, nickel and stainless steel.

In the formation of the negative electrodes and the positive electrodes, various known additives such as conductive agents and binders may be used appropriately.

[Electrolytes]

The electrolyte that is used may be a usual nonaqueous electrolyte containing a lithium salt such as $LiPF_6$ or $LiBF_4$ as the electrolyte salt.

The nonaqueous electrolyte may be a liquid nonaqueous electrolyte solution or a polymer electrolyte such as a solid electrolyte or a gel electrolyte.

In the case of the liquid nonaqueous electrolyte solutions, aprotic organic solvents such as ethylene carbonate, propylene carbonate and dimethyl carbonate may be used as the nonaqueous solvents.

The polymer electrolytes contain matrix polymers that are gelled with plasticizers (nonaqueous electrolyte solutions). The matrix polymer may be a polymer or a mixture of polymers, for example, ether polymers such as polyethylene oxide and crosslinked products thereof, polymethacrylates, polyacrylates, and fluoropolymers such as polyvinylidene fluoride and vinylidene fluoride-hexafluoropropylene copolymer. In particular, fluoropolymers are preferable from viewpoints such as redox stability.

The electrolyte salts and the nonaqueous solvents that constitute the plasticizers (the nonaqueous electrolyte solutions) used in the polymer electrolytes may be similar to those used in the liquid electrolyte solutions.

The lithium ion secondary batteries of embodiments of the invention usually involve separators such as microporous films of polypropylene or polyethylene, stacks of such films, and nonwoven fabrics of such materials. The use of gel electrolytes is also possible. In this case, for example, the negative electrode containing the inventive amorphous carbon particles, the gel electrolyte and the positive electrode are stacked in this order and accommodated inside a battery case.

The lithium ion secondary batteries of embodiments of the invention may have any structures, and the shapes or the configurations of the structures are not particularly limited and may be freely selected from, for example, cylindrical forms, square forms and coin forms.

EXAMPLES

Hereinbelow, embodiments of the present invention will be described in detail based on EXAMPLES without limiting the scope of the invention to such EXAMPLES.

Example 1

In an autoclave equipped with an anchor stirrer, 1000 g of a coal tar pitch (residual carbon content: 60 mass %, quinoline insoluble (QI): 0.1 mass %) was heated to a fluid state. Thereafter, 30 g of a crushed powder (average particle diameter: 6 μm) of mesocarbon microspheres manufactured by JFE Chemical Corporation as mesophase particles was added in small portions while performing stirring. The mixture was stirred to homogeneity.

After the stirring, the mixture was heated to 320° C. in the autoclave under a stream of nitrogen. Thereafter, compressed air was supplied at 2 L/min and blown into the pitch, and the pitch was heated at 320° C. for 5 hours, thereby performing a crosslinking treatment by the air blowing reaction. Thereafter, the product was cooled to room temperature and was collected. The oxygen content in the product obtained is described in Table 1.

Next, the product was crushed into a powder with an atomizer, and the grain size was adjusted to an average particle diameter of 12 μm. The particles were placed into a rotary furnace. While supplying compressed air at 2 L/min, the temperature was increased at 20° C./h and held at 250° C. for 3 hours, thereby performing an infusibilization treatment. The product was then allowed to cool. The oxygen content in the infusibilized product obtained is described in Table 1.

Next, 100 g of the infusibilized product was placed into a graphite container with a lid. Under a stream of nitrogen, the temperature was increased at a rate of 100° C./h and firing was performed at 1150° C. for 2 hours. In this manner, a carbon powder was obtained.

Figure 2:
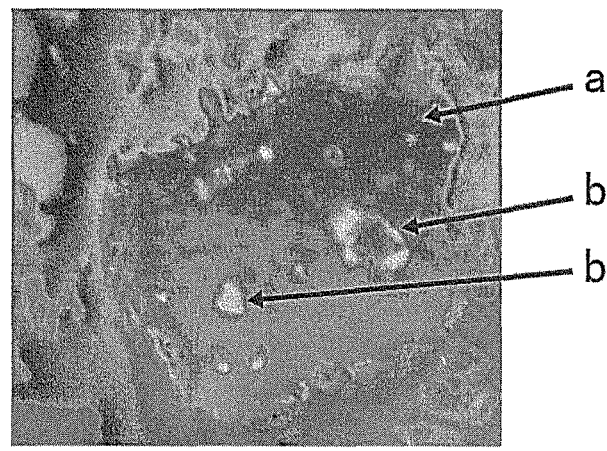
FIG. 2 is a polarized micrograph of a cross section of a carbon particle obtained in EXAMPLE 1.

The carbon powder obtained was buried in a resin, and a cross section was polished and observed on a polarizing microscope. FIG. 2 is a polarized micrograph of the cross section of the carbon particles obtained in EXAMPLE 1. Micro regions b scattered in a carbon particle a exhibited optical anisotropy, and the other regions exhibited optical isotropy. The micro regions b were probably derived from the mesophase particles that had been added.

Examples 2 and 3

In EXAMPLES 2 and 3, carbon powders were obtained in the same manner as in EXAMPLE 1, except that the coal tar pitch and the mesophase particles (the mesocarbon microspheres) were changed as described in Table 1.

Example 4

An autoclave equipped with an anchor stirrer was loaded with 1000 g of a coal tar pitch (residual carbon content: 60 mass %, quinoline insoluble (QI): 0.1 mass %). While performing stirring, the pitch was heated to 400° C. in the autoclave under a stream of nitrogen and was allowed to react for 6 hours, thereby converting the pitch into a bulk mesophase pitch. The product was cooled to room temperature and was collected. Thereafter, the product was crushed into a powder with an atomizer to an average particle diameter of 3 μm. The bulk mesophase pitch in the form of a powder had a quinoline insoluble content of 73 mass %. The observation of a cross section on a polarizing microscope showed that substantially the entire cross section had optical anisotropy, although some regions exhibited optical isotropy.

A carbon powder was obtained by the same procedures as in EXAMPLE 1, except that the bulk mesophase pitch obtained above was used as the mesophase particles in place of the crushed powder of the mesocarbon microspheres.

Example 5

A carbon powder was obtained in the same manner as in EXAMPLE 1, except that the amount of the bulk mesophase pitch obtained in EXAMPLE 4 was changed as described in Table 1.

Example 6

An autoclave equipped with an anchor stirrer was loaded with 1000 g of a coal tar pitch (residual carbon content: 60 mass %, quinoline insoluble (QI): 0.1 mass %). While performing stirring, the pitch was heated to 400° C. in the autoclave under a stream of nitrogen and was allowed to react for 5 hours, thereby converting the pitch into a bulk mesophase pitch. The product was cooled to room temperature and was collected. Thereafter, the product was crushed into a powder with an atomizer to an average particle diameter of 3 μm. The bulk mesophase pitch in the form of a powder had a quinoline insoluble content of 68 mass %.

The powder was placed into a rotary furnace. While supplying compressed air at 2 L/min, the temperature was increased at 20° C./h and held at 250° C. for 1 hour, thereby performing an infusibilization treatment. The product was then allowed to cool. The resultant infusible bulk mesophase pitch had an oxygen content of 4.8 mass % and QI of 99 mass %. The observation of a cross section on a polarizing microscope showed that substantially the entire cross section had optical anisotropy, although some regions exhibited optical isotropy.

A carbon powder was obtained by the same procedures as in EXAMPLE 1, except that the infusible bulk mesophase pitch obtained above was used as the mesophase particles in place of the crushed powder of the mesocarbon microspheres.

Example 7

In an autoclave equipped with an anchor stirrer, 1000 g of a coal tar pitch (residual carbon content: 60 mass %, quinoline insoluble (QI): 0.1 mass %) was heated to 320° C. under a stream of nitrogen. Thereafter, compressed air was supplied at 2 L/min and blown into the pitch, and the pitch was heated at 320° C. for 5 hours, thereby performing a crosslinking treatment by the air blowing reaction. Thereafter, a fluid mixture of 30 g of a crushed powder (average particle diameter: 3 μm) of mesocarbon microspheres manufactured by JFE Chemical Corporation with a small amount of a coal tar pitch was added in small portions while performing stirring. The mixture was stirred to homogeneity. The product was cooled to room temperature and was collected. The oxygen content in the product obtained is described in Table 1.

Next, the product was crushed into a powder with an atomizer, and the grain size was adjusted to an average particle diameter of 10 to 15 μm. The particles were placed into a rotary furnace. While supplying compressed air at 2 L/min, the temperature was increased at 20° C./h and held at 250° C. for 3 hours, thereby performing an infusibilization treatment. The product was then allowed to cool. The oxygen content in the infusibilized product obtained is described in Table 1.

Next, 100 g of the infusibilized product was placed into a graphite container with a lid. Under a stream of nitrogen, the temperature was increased at a rate of 100° C./h and firing was performed at 1150° C. for 2 hours. In this manner, a carbon powder was obtained.

In the same manner as described in EXAMPLE 1, cross sections of the carbon powders obtained in EXAMPLES 2 to 7 were observed on a polarizing microscope. The observation showed that the structures were similar to that illustrated in FIG. 2, with optically anisotropic micro regions being scattered in a carbon particle.

Comparative Example 1

In COMPARATIVE EXAMPLE 1, a carbon powder was obtained in the same manner as in EXAMPLE 1, except that the mesophase particles were not added to the coal tar pitch.

Comparative Example 2

In COMPARATIVE EXAMPLE 2, mesophase particles, namely, a crushed powder (average particle diameter: 3 μm) of mesocarbon microspheres manufactured by JFE Chemical Corporation was placed into a graphite container with a lid. Under a stream of nitrogen, the temperature was increased at a rate of 100° C./h and firing was performed at 1150° C. for 2 hours. Thus, a baked product of the mesophase particles (a carbon powder) was obtained.

Comparative Example 3

In COMPARATIVE EXAMPLE 3, a carbon powder was obtained in the same manner as in COMPARATIVE EXAMPLE 1. In the preparation of a negative electrode mixture paste described later, 10 parts by mass of the carbon powder obtained in COMPARATIVE EXAMPLE 2 was admixed with 100 parts by mass of this carbon powder, and the mixture (hereinafter, simply written as the "carbon powder") was used as a negative electrode material.

Comparative Example 4

In an autoclave equipped with an anchor stirrer, 1000 g of a coal tar pitch (residual carbon content: 60 mass %, quinoline insoluble (QI): 0.1 mass %) was heated to a fluid state. Thereafter, the pitch was heated to 320° C. in the autoclave under a stream of nitrogen while performing stirring. Thereafter, compressed air was supplied at 2 L/min and blown into the pitch, and the pitch was heated at 320° C. for 5 hours, thereby performing a crosslinking treatment by the air blowing reaction. Thereafter, the product was cooled to room temperature and was collected. The oxygen content in the product obtained was 1.0 mass %.

Next, the product was crushed into a powder with an atomizer, and the grain size was adjusted to an average particle diameter of 4 μm. The particles were placed into a rotary furnace. While supplying compressed air at 2 L/min, the temperature was increased at 20° C./h and held at 250° C. for 3 hours, thereby performing an infusibilization treatment. The product was then allowed to cool. The resultant infusibilized product had an oxygen content of 7.4 mass %. The observation of a cross section on a polarizing microscope showed that the entire cross section had optical isotropy. The isotropic infusible carbon product obtained here corresponds to an intermediate of the product in COMPARATIVE EXAMPLE 1.

A carbon powder was obtained in the same manner as in EXAMPLE 1, except that the mesophase particles were replaced by 30 g of the isotropic carbon material obtained by the above method.

<Evaluations>
(Evaluation of Baked Carbon Powders)

First, the carbon powders obtained by firing in EXAMPLES and COMPARATIVE EXAMPLES were tested by the aforementioned methods to measure the average particle diameters (unit: μm), the specific surface areas (unit: $m^2/g$) and the true specific gravities (unit: $g/cm^3$). The results are described in Table 1.

Next, sample coin-shaped secondary batteries (see FIG. 1) were fabricated while using the carbon powders obtained in EXAMPLES and COMPARATIVE EXAMPLES as negative electrode materials. The sample batteries were evaluated.

(Preparation of Negative Electrode Mixture Pastes)

First, a negative electrode mixture paste was prepared using the carbon powder as a negative electrode material. Specifically, a planetary mixer was loaded with the carbon powder (95 parts by mass) and a 12% N-methylpyrrolidinone solution of polyvinylidene difluoride (5 parts by mass in terms of solid). These were stirred at 100 rpm for 15 minutes. An additional amount of N-methylpyrrolidinone was added to adjust the solid content to 60%, and stirring was performed for another 15 minutes. Thus, a negative electrode mixture paste was prepared.

(Fabrication of Working Electrodes (Negative Electrodes))

The negative electrode mixture paste prepared was applied onto a copper foil with a uniform thickness. The coated foil was placed in an air blow dryer, and the solvent was evaporated at 100° C., thereby forming a negative electrode mixture layer. Next, the negative electrode mixture layer was pressed with a roller press and was punched into a circular shape with a diameter of 15.5 mm. Thus, a working electrode (a negative electrode) was fabricated which had the negative electrode mixture layer closely attached to the copper foil collector. Before subjected to evaluation, the electrode was dried in vacuum at 100° C. for at least 8 hours.

(Pressability of Electrodes (Electrode Density))

The working electrode fabricated was interposed between specular plates having a specific area and was subjected to a pressure of 250 MPa on a hand press machine for 20 seconds. The electrode density (unit: $g/cm^3$) was then measured. The electrode density was determined by calculation using the mass and the thickness of the negative electrode mixture layer. The higher the electrode density, the higher the pressability.

(Preparation of Electrolyte)

Ethylene carbonate (33 vol %) and methyl ethyl carbonate (67 vol %) were mixed with each other, and $LiPF_6$ was dissolved in the mixed solvent in a concentration of 1 $mol/dm^3$. Thus, a nonaqueous electrolyte was prepared.

A separator 5 and the working electrode (the negative electrode) 2 (both illustrated in FIG. 1) were soaked in the nonaqueous electrolyte and were impregnated with the solution beforehand.

(Fabrication of Sample Batteries)

Next, a sample coin-shaped secondary battery illustrated in FIG. 1 (also written simply as the "sample battery") was fabricated using the working electrode (the negative electrode). FIG. 1 is a sectional view illustrating the sample coin-shaped secondary battery.

First, a lithium metal foil was pressed against a nickel net, and these were punched together into a circular shape having a diameter of 15.5 mm. Thus, a circular counter electrode 4 was prepared which was composed of the lithium foil closely attached to the nickel net collector 7a.

Next, the separator 5 was interposed between the working electrode (the negative electrode) 2 closely attached to the collector 7b and the counter electrode 4 closely attached to the collector 7a. Thereafter, the working electrode 2 was accommodated in an exterior cup 1, and the counter electrode 4 in an exterior can 3. The exterior cup 1 and the exterior can 3 were coupled together, and peripheral portions of the exterior cup 1 and the exterior can 3 were engaged with each other through an insulating gasket 6, thereby tightly closing the structure. The sample battery was thus fabricated.

In the sample battery fabricated, the peripheral portions of the exterior cup 1 and the exterior can 3 were engaged with each other through the insulating gasket 6, and consequently the structure was tightly closed. Inside the closed structure, as illustrated in FIG. 1, the collector 7a, the counter electrode 4, the separator 5, the working electrode (the negative electrode) 2 and the collector 7b were stacked sequentially from the inner surface of the exterior can 3 toward the inner surface of the exterior cup 1.

(Charging and Discharging Test)

The sample battery fabricated was subjected to the following charging and discharging test at 25° C. In the test, "charging" was the process in which lithium ions were doped into the carbon powder, and "discharging" was the process in which the lithium ions were dedoped from the carbon powder.

First, the battery was charged at a constant current of 0.9 mA until the circuit voltage reached 0 mV. When the circuit voltage reached 0 mV, the charging was switched to constant-voltage charging, and the battery was continuously charged until the current value became 20 μA. The charging capacity (also the "initial charging capacity") (unit: mAh/g) was determined from the amount of current that had been passed during this process. Thereafter, the battery was allowed to stand for 120 minutes. Next, the battery was discharged at a constant current of 0.9 mA until the circuit voltage reached 1.5 V. The discharging capacity (also the "initial discharging capacity") (unit: mAh/g) was determined from the amount of current that had been passed during this process. This was the first cycle.

(Initial Charging and Discharging Efficiency)

Based on the results of the charging and discharging test, the initial charging and discharging efficiency (unit: %) was obtained from the following equation.

Initial charging and discharging efficiency=(Initial discharging capacity/Initial charging capacity)×100

(Rate of Expansion During Charging)

The sample battery fabricated was charged under the same conditions as in the determination of the initial charging capacity, and was disassembled while avoiding short circuits. The thickness of the working electrode (the negative electrode) in the charged state was measured with a micrometer. Prior to this, the thickness of the working electrode (the negative electrode) before the charging had been measured beforehand. The rate of expansion during charging (unit: %) was determined from the following equation. The lower the rate, the smaller the expansion and shrinkage during charging and discharging.

Rate of expansion during charging=(Thickness of electrode in charged state/Thickness of electrode before charging)×100−100

Table 2 describes the results of the measurements of the electrode density, the initial discharging capacity, the initial charging and discharging efficiency, and the rate of expansion during charging.

TABLE 1

|  |  | Pitch QI [mass %] | Mesophase particles | | After crosslinking treatment Oxygen content [mass %] | After infusibilization treatment Oxygen content [mass %] | After firing | | | Remarks |
|---|---|---|---|---|---|---|---|---|---|---|
|  |  |  | Amount [mass %] | Ave. part. diam. [μm] |  |  | Ave. part. diam. [μm] | Specif. surface area [m²/g] | True specif. gravity [g/cm³] |  |
| EX. | 1 | 0.1 | 3 | 6 | 1.1 | 7.5 | 12 | 1.44 | 1.609 | — |
|  | 2 | 0.1 | 10 | 3 | 1.0 | 6.9 | 14 | 1.32 | 1.638 | — |
|  | 3 | 0 | 10 | 6 | 1.0 | 6.1 | 12 | 1.38 | 1.640 | — |
|  | 4 | 0.1 | 5 | 3 | 1.1 | 7.2 | 14 | 1.33 | 1.622 | — |
|  | 5 | 0.1 | 10 | 3 | 1.0 | 7.4 | 12 | 1.46 | 1.642 | — |
|  | 6 | 0.1 | 10 | 3 | 1.0 | 7.8 | 11 | 1.67 | 1.635 | — |
|  | 7 | 0.1 | 3 | 3 | 1.0 | 7.2 | 9 | 1.73 | 1.641 | — |
| COMP. EX. | 1 | 0.1 | — | — | 1.1 | 7.8 | 10 | 1.52 | 1.602 | — |
|  | 2 | — | — | — | — | — | 3 | 2.33 | 2.000 | — |
|  | 3 | 0.1 | — | — | 1.1 | 7.8 | 10 | — | — | The preparation of the negative electrode mixture paste involved 10 mass % of the carbon powder of COMP. EX. 2. |
|  | 4 | 0.1 | 3* | 4* | 1.1 | 7.8 | 9 | 1.6 | 1.599 | *The (isotropic) intermediate of COMP. EX. 1 was added in place of the mesophase particles. |

TABLE 2

|  |  | Electrode density (250 MPa) [g/cm³] | Initial discharging capacity [mAh/g] | Initial charging and discharging efficiency [%] | Rate of expansion during charging [%] |
|---|---|---|---|---|---|
| EX. | 1 | 1.03 | 400 | 79.0 | 4.0 |
|  | 2 | 1.07 | 383 | 82.0 | 4.0 |
|  | 3 | 1.12 | 382 | 81.0 | 4.0 |
|  | 4 | 1.05 | 392 | 79.5 | 4.5 |
|  | 5 | 1.08 | 380 | 80.5 | 4.8 |
|  | 6 | 1.07 | 379 | 80.0 | 4.0 |
|  | 7 | 1.04 | 387 | 78.7 | 4.0 |
| COMP. EX. | 1 | 1.01 | 398 | 77.6 | 4.0 |
|  | 2 | 1.28 | 263 | 85.0 | 9.0 |
|  | 3 | 1.07 | 381 | 77.6 | 7.0 |
|  | 4 | 0.99 | 397 | 76.9 | 4.5 |

From the comparison between EXAMPLES 1 to 7 and COMPARATIVE EXAMPLE 1, EXAMPLES 1 to 7 resulted in large values of true specific gravity and improved electrode densities, and excellent pressability has been demonstrated, as compared to COMPARATIVE EXAMPLE 1 in which the mesophase particles were not added to the amorphous carbon precursor.

Further, the comparison between EXAMPLES 1 to 7 and COMPARATIVE EXAMPLE 3 shows that COMPARATIVE EXAMPLE 3 achieved relatively good results such as in electrode density but resulted in a high rate of expansion during charging. This large expansion in COMPARATIVE EXAMPLE 3 was probably ascribed to the additivity of the mesophase particles having a high expansion rate.

From the comparison between EXAMPLES 1 to 7 and COMPARATIVE EXAMPLE 4, EXAMPLES 1 to 7 resulted in large values of true specific gravity and improved electrode densities, and excellent pressability has been demonstrated, as compared to COMPARATIVE EXAMPLE 4 in which the optically isotropic carbon material was added to the amorphous carbon precursor.

In EXAMPLES 1 to 7, expansion was suppressed and low rates of expansion were obtained during charging probably as a result of the fact that the mesophase particles had been fused together with the crosslinked amorphous carbon component.

REFERENCE SIGNS LIST

1 EXTERIOR CUP
2 WORKING ELECTRODE (NEGATIVE ELECTRODE)
3 EXTERIOR CAN
4 COUNTER ELECTRODE
5 SEPARATOR
6 INSULATING GASKET
7a COLLECTOR
7b COLLECTOR
a CARBON PARTICLE b MICRO REGION

The invention claimed is:

1. A method for producing amorphous carbon particles, the method comprising:
(a) (i) obtaining a first crosslinked product by first mixing mesophase particles with an amorphous carbon precursor and then subjecting the mixture to a crosslinking treatment including an air blowing reaction performed in a liquid phase reaction at a temperature in a range of 280 to 420° C., or (ii) obtaining a second crosslinked product by first crosslinking the amorphous carbon precursor and then mixing the mesophase particles with the crosslinked precursor; and
(b) subjecting the first or second crosslinked product to an infusibilization treatment performed in a solid phase using an oxidizing gas to form an infusibilized product having an oxygen content in a range of 3 to 20 mass % and then firing the infusibilization product to produce amorphous carbon particles, such that the mesophase particles are within the amorphous carbon particles,
wherein crushing is performed at least one of before and after the infusibilization treatment.

2. The method for producing the amorphous carbon particles according to claim 1, wherein the mesophase particles are added in an amount in a range of 1 to 70 mass % relative to the amount of the amorphous carbon precursor.

3. The method for producing the amorphous carbon particles according to claim 1, wherein the infusibilization treatment includes further crosslinking the first or second crosslinked product.

4. The method for producing the amorphous carbon particles according to claim 1, wherein the amorphous carbon precursor includes at least one selected from the group consisting of a pitch and a resin.

5. The method for producing the amorphous carbon particles according to claim 4, wherein the pitch includes at least one selected from the group consisting of a coal pitch and a petroleum pitch.

6. The method for producing the amorphous carbon particles according to claim 1, wherein the mesophase particles are optically anisotropic carbonaceous particles comprising mesophase structures.

7. The method for producing the amorphous carbon particles according to claim 6, wherein an amount of residual optically isotropic pitch portions in the mesophase particles is not more than 30 by mass %.

8. The method for producing the amorphous carbon particles according to claim 6, wherein in residual optically isotropic pitch portions in the mesophase particles a quinoline insoluble content is 70 mass % or more.

9. The method for producing the amorphous carbon particles according to claim 1, wherein the air blowing reaction is performed by blowing air at a rate in a range of 0.5 to 10 L/min.

10. The method for producing the amorphous carbon particles according to claim 1, wherein performing the infusibilization treatment includes blowing the oxidizing gas at a rate in a range of 1.0 to 20 L/min.

11. The method for producing the amorphous carbon particles according to claim 1, wherein the amorphous carbon particles have an average particle diameter in a range of 1 to 25 μm.

12. The method for producing the amorphous carbon particles according to claim 1, wherein the amorphous carbon particles have a specific surface area of not more than 10 m$^2$/g.

13. The method for producing the amorphous carbon particles according to claim 1, wherein the amorphous carbon particles have an average lattice distance $d_{002}$ of not less than 0.345 nm.

14. The method for producing the amorphous carbon particles according to claim 1, wherein the amorphous carbon particles have a specific gravity of not less than 1.600 g/cm$^3$.

15. The method for producing the amorphous carbon particles according to claim 1, wherein the first or second crosslinked product or the infusibilized product is subjected to a mechanochemical treatment.

* * * * *